United States Patent [19]

Henning

[11] Patent Number: 5,201,213
[45] Date of Patent: * Apr. 13, 1993

[54] PRESSURE LEAK DETECTION DEVICE

[76] Inventor: Karl Henning, 11301 71st St., Burr Ridge, Ill. 60525

[ * ] Notice: The portion of the term of this patent subsequent to Aug. 13, 2009 has been disclaimed.

[21] Appl. No.: 496,597

[22] Filed: Mar. 21, 1990

[51] Int. Cl.$^5$ ............................................. G01M 3/26
[52] U.S. Cl. ......................................... 73/49.2; 73/40
[58] Field of Search .................. 73/40, 49.2 T, 49.2 R, 73/37, 49.7

[56] References Cited

U.S. PATENT DOCUMENTS

| | | | |
|---|---|---|---|
| 3,035,435 | 5/1962 | Johnson | 73/40 |
| 3,805,593 | 4/1974 | Sandoz et al. | 73/49.2 R |
| 4,103,537 | 8/1978 | Victor | 73/40.5 R |
| 4,708,014 | 11/1987 | Janitz | 73/49.2 R |
| 5,069,062 | 3/1991 | Malecek et al. | 73/49.7 |

*Primary Examiner*—Tom Noland

[57] ABSTRACT

A pressure testing device for detecting leaks in shipping vessels such as tank cars, delivery pipes, and tanker trucks. A hand-operated pump provides a source of pressure, with the pump having a hand plunger reciprocating within a pump body with handles at each end. At the end opposite the plunger handle there is a bifurcated fitting with a one-way valve in each of its two branches, with a first branch permitting only pump intake, and the second branch permitting only pump discharge. Both branches are fitted with quick-disconnect couplings which mate with a detachable flexible hose terminating in a test closure or pressure fitting having a shutoff valve and a pressure gauge. In use, the operator attaches the test closure to the vessel or pipe to be tested, attaches the hose to the proper coupling for delivery of the positive or negative pressure differential as desired, and operates the reciprocating hand plunger until the desired pressure differential is indicated on the gauge. The shutoff valve is then closed, and the gauge is observed to detect any pressure variation over time which would indicate a leak in the vessel. The pump is sized so that the operator can achieve a full stroke by holding the opposite handles with both hands in the manner of an archer drawing a bow. The pump body handles also serve as a storage frame for winding and storing the flexible hose.

4 Claims, 1 Drawing Sheet

PRESSURE LEAK DETECTION DEVICE

BACKGROUND OF THE INVENTION

The importance of pressure and vacuum testing of bulk transport equipment has always been recognized by responsible shippers and haulers, but with increasing concern for protection of the environment, such testing has reached the stage of critical importance for some industries.

Hazardous and biologically active chemicals and substances of all kinds must be carried over railroads and highways, and the public must be assured that the vehicles and containers are fit to carry these sometimes dangerous products. Just as commercial aircraft must be carefully inspected before each flight, good operating practices require that over-the-road tank trucks and trailers also be checked and verified free of leakage before being used to haul potentially toxic or hazardous materials.

Previous testing practices were often haphazard, and depended on the equipment and facilities available at the point of testing and filling. For example, some chemical haulers require each tanker to be individually tested before filling, and provide an electric vacuum pump to be attached to the tank vessel with appropriate fittings. A vacuum is drawn and held, and any significant change in the internal pressure over time signals the presence of a possible leak.

This kind of test is easy to do when the equipment is handy and there is an electric outlet to plug it in, but many locations are not so well situated. Also, this kind of testing apparatus can be heavy, awkward, and difficult to use in inclement weather. If an electric pump is required, then additional difficulties are presented in hazardous environments where no chance of sparking can be tolerated.

These and other obstacles with present testing equipment and procedures tend to discourage regular testing of hauling equipment, and every failure to test is a potential hazard to public safety should there be an undiscovered leak.

It is therefore an object of the present invention to provide a simple, inexpensive and easy-to-use testing apparatus with which an operator can quickly test his tank truck or car and related equipment with a minimum of effort.

It is a further object of the invention to provide such a tester which will readily test both positive and negative pressure environments (pressure and vacuum) with the same piece of equipment.

Another object of the invention is to provide a tester which is easily operated by hand, eliminating the requirement for a supply of compressed gas or a source of electric power, and which can be used in hazardous environments without the danger of sparking.

SUMMARY OF THE INVENTION

A hand-operated pump is used to provide a convenient source of pressure for creating a pressure differential in the vessel or pipe to be tested. The pump has a reciprocating hand-operated plunger received by a pump body having hand-holds at each end for easy gripping and operation.

At the end of the pump opposite the plunger handle there is a bifurcated pressure fitting with one-way valves in each of its two branches. The first branch permits only pump intake, and the second branch permits only pump discharge. Both branches have quick-disconnect couplings.

A test closure or pressure fitting is adapted to mate with the vessel, pipe or other container to be tested, and has a shutoff valve and a pressure gauge, and a flexible hose terminating in a quick-disconnect fitting which mates with one or the other of the branches of the bifurcated pump pressure fitting.

In use, the operator attaches the test closure to the vessel or pipe to be tested, attaches the hose to the proper coupling for delivery of the positive or negative pressure differential as desired, and operates the reciprocating hand plunger until the desired pressure differential is indicated on the gauge. The shutoff valve is then closed, and the gauge is observed to detect any pressure variation over time which would indicate a leak in the vessel.

THE DRAWINGS

DETAILED DESCRIPTION OF THE INVENTION

Figure 1:
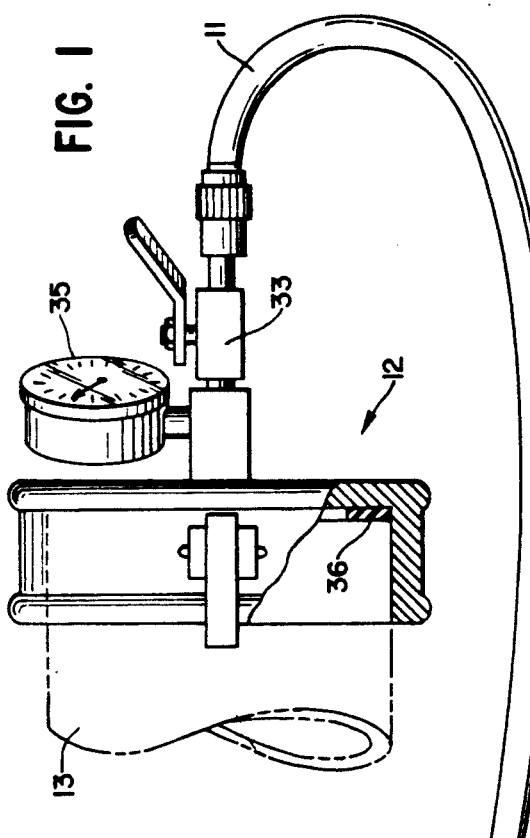
FIG. 1 is a side cross-sectional elevation of the improved pressure tester of the present invention, including its several component parts, as it would be fitted to a delivery pipe (shown in phantom) for testing.
Figure 3:
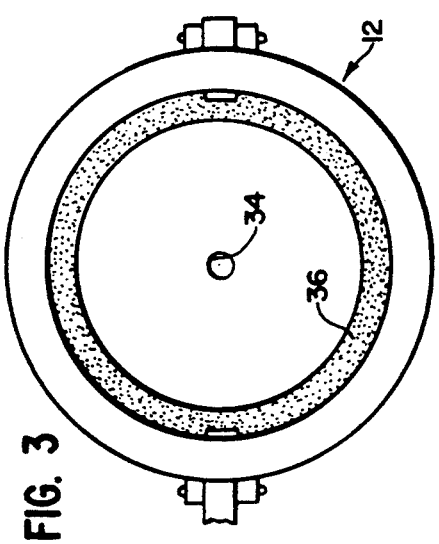
FIG. 3 is an end elevation of the test closure of FIG. 1.
Figure 2:
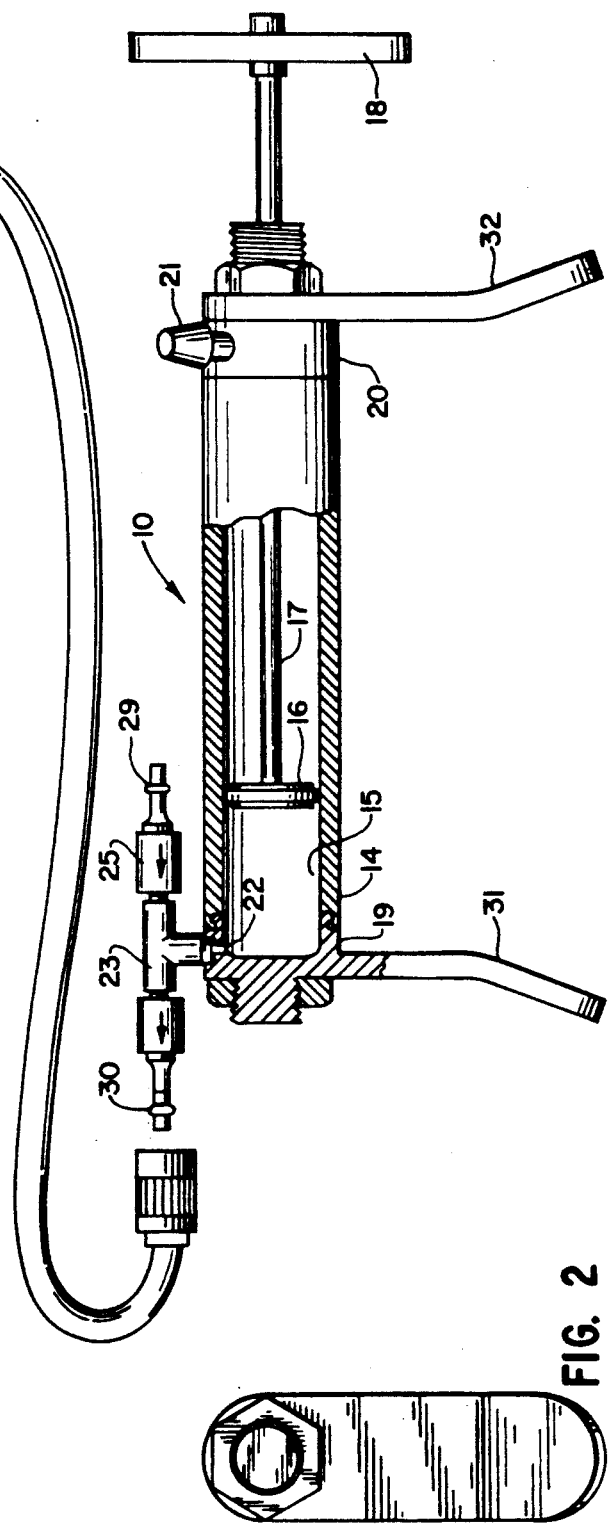
FIG. 2 is an end elevation of the pump of FIG. 1.

The improved pressure tester of the invention comprises three main elements: a pump 10, a flexible pressure hose 11, and a coupling means 12 adapted to fit in a pressure-sealing relationship to a container, pipe or other vessel 13 to be tested (indicated in phantom lines). Each of the elements may be constructed of conventional materials, but for use in hazardous environments, non-sparking materials such as aluminum, brass or stainless steel are preferred.

The pump 10 consists of a cylindrical body 14 having a pressure chamber 15 within. A sealed plunger 16 is received in the body 14 for reciprocating motion, and is connected by an operating rod 17 to a first handle 18 which protrudes from the pump body 14 to be grasped by the operator. In the present embodiment, the body 14 is constructed of tubular stock and threaded at each end to receive end closures 19, 20.

The end of the plunger 16 opposite the pressure chamber 15 is open to the atmosphere through a filter vent 21, and the operating rod 17 itself extends through one end closure 20 and terminates at the first handle 18. The opposite end of the plunger 16 reciprocates in the pressure chamber 15 and serves to force the fluid (in this case, air) through a pressure passage 22 in the closure 19 leading to a bifurcated external fitting 23.

The bifurcated fitting 23 has two branches; a first branch having a one-way valve 25 permitting only intake of fluid to the pressure chamber 15, and a second branch with a one-way valve 26 permitting only discharge of fluid from the pressure chamber 15. Each branch terminates in a hose coupling means 29, 30, which in the best mode of the invention consists of a quick-disconnect coupling. Such couplings are commonly employed in air lines for air-operated tools and the like.

According to the invention, the pump body 14 is also provided with a second handle 31 positioned for the operator to grasp simultaneously with the first handle 18, so that the device can be operated without having to be placed on the ground or against some other object, as would be the case with the familiar bicycle-style air pump. Preferably, this second handle 31 is in the shape of a bar, and is adapted to be gripped by the operator with one hand. In the illustrated embodiment, the second handle 31 is secured to the end of the body 14 opposite the first handle 18 by a nut. It is in the form of a short bar, rounded at the end, with a slight curve which enables the operator to firmly hold it at arm's length while pumping the first handle with the other hand, with the same motion an archer might use in drawing a bow. Preferably, the cylinder and pump handle, when collapsed, is about fifteen inches long, with a pump stroke of about ten inches, so that when the pump rod is fully withdrawn, the handles are about twenty-five inches apart, which is a distance that the average operator can comfortably reach without straining.

The second handle can also be in the form of a knurled or roughened surface on the pump body (not shown), and can be fitted with a rubber or plastic covering to cushion the operator's grip.

As a further feature of the invention the pump body 14 is provided with a third handle 32 positioned opposite the first, for situations where an alternate hand-hold is desired. The third handle 32 may be shaped like the second, or may be in a different shape if required. Like the second handle 31, in the illustrated embodiment the third handle 32 is also secured to the pump body 14 by a nut. The third handle 32 may be grasped for making relatively short strokes, and the second handle used for longer strokes. Also, the provision of two handles permits the operator to change position while pumping, thereby to use alleviate fatigue and unnecessary muscle strain.

A further advantage of the two handles is that the size of the pump body permits them to be spaced about thirteen and one-half inches apart, which is a convenient distance for use as storage frame for wrapping the hose 11 when not in use.

In use, the flexible pressure hose 11 is selectively connected to either the intake or discharge sides of the bifurcated fitting 23. When connected to the intake side, each draw stroke of the pump plunger 16 draws fluid (air, in this example) through the hose 11 into the pressure chamber 15, and each pump stroke expels it through the discharge fitting, causing the pump to create a vacuum in the container to be tested.

Alternatively, when connected to the discharge side, each pump stroke of the pump plunger 16 expels fluid through the hose 11 into container 13 to be tested, and each draw stroke re-fills the chamber through the intake fitting, ready for the next stroke. This imparts a positive pressure in the container to be tested.

The flexible hose 11 extends from the pump body 14 to the test coupling means 12 where it is attached to a shutoff valve 33 by any convenient means, such as a threaded connector. The shutoff valve 33 communicates through a passage 34 with the container to be tested. A pressure measuring and indicating means, such as a conventional pressure gauge 35, is fitted to the coupling means 12 so as to measure the pressure differential between the interior of the container and the atmosphere.

According to the invention, testing is accomplished by securely affixing the coupling means 12 to the container 13 to be tested with a pressure-tight seal. In the illustrated embodiment, the container is a transfer hose of the sort commonly employed on tanker trucks. Each section of hose is tested separately. First, a conventional closure (not shown) is placed at one end of the hose. Next, the coupling means 12 of the present invention is secured to the other end by a toggle latch, clamping band, or other conventional means. A gasket 36 between the end of the hose and the coupling means assures a positive seal.

To accomplish the test, the operator selects either a positive or a negative pressure differential (compared to atmospheric) to be applied to the container. If the differential is to be positive, the hose 11 is connected to the discharge coupling means 30 of the bifurcated fitting 23, and the shutoff valve 33 is opened. The pump 10 is then operated by hand to discharge air through the hose and into the container, pressurizing it. Return of the pressurized air is prevented by the one-way valve 26 in the discharge fitting 23. Pumping is continued until the desired pressure differential is indicate on the gauge 35, at which point the shutoff valve 33 is closed to positively seal off the container, which is now pressurized. The operator then observes changes in the indicated pressure over time to detect whether pressure is being lost, and if so, at what rate. The device of the invention is easily able to produce pressure differentials of as much as one atmosphere (15 psig).

To test with a negative differential, the procedure is similar, except that the hose 11 is connected to the intake coupling means 29 of the bifurcated fitting 23. The pump 10 is operated until the desired differential is achieved, the shutoff valve 33 is closed, and the operator observes the gauge 35 to determine whether the rate of change exceeds acceptable limits. In this mode, the device of the invention is capable of producing, if required, a negative pressure differential of 25 to 28 inches of mercury.

Further according to the invention, the discharge side of the bifurcated fitting is positioned to direct its flow directly away from the operator, in the event that some leaking fluid should be drawn into the pump and during pumping, or when the equipment is being collapsed for storage.

I claim as my invention:

1. A pressure testing device for detecting leaks in containers, comprising a hand-operated reciprocating pump for creating a pressure differential within a container to be tested, said pump including a cylindrical body enclosing a pressure chamber and a plunger received in the body for reciprocating motion to compress a fluid in the pressure chamber, the plunger having a first handle protruding from the pump body and a second handle on the pump body positioned for simultaneous grasping with the first handle by an operator, the pump body having a pressure passage terminating in a bifurcated fitting with a first branch having a one-way valve permitting only intake to the pressure chamber, and a second branch having a one-way valve permitting only discharge from the pressure chamber, and each branch terminating in a quick-release coupling means, a pressure conduit comprising co-operating quick-release coupling means for selectively mating with either one of the coupling means of the pump fitting, a flexible hose, and a test closure adapted to mate with the container, the test closure having a passage communicating with the interior of the container, a shutoff valve interposed in said passage, a quick-release attachment means for mating in sealing engagement with the container to be tested, and a pressure sensing and indicating means for indicating a change in the differential pressure within the container over time.

2. The device of claim 1 in which the second handle on the pump body is a bar adapted to be gripped by the operator with one hand.

3. The device of claim 2 in which the second handle is positioned at one end of the pump body opposite the plunger handle, and a third handle consisting of a bar adapted to be gripped by the operator with one hand is positioned at the end of the pump body opposite the second handle.

4. The device of claim 3 in which all metal parts are composed of non-sparking metal alloys.

* * * * *